June 9, 1959  E. S. SNAVELY, JR  2,890,414
ELECTROCHEMICAL COULOMETER
Filed Feb. 26, 1958
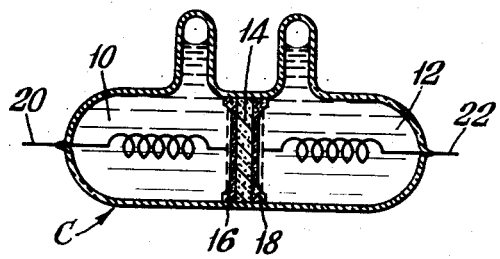
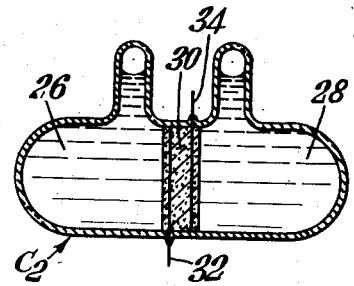
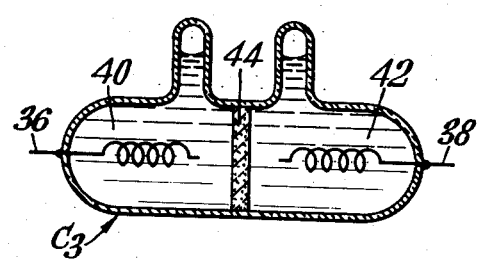
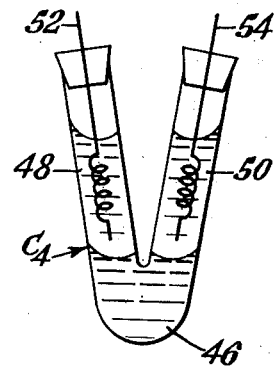
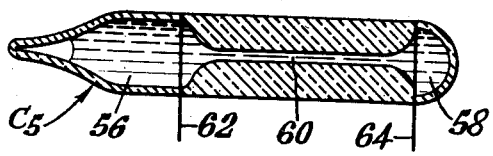
INVENTOR
EARL S. SNAVELY, JR
BY
ATTORNEY

# United States Patent Office 2,890,414
Patented June 9, 1959

2,890,414

ELECTROCHEMICAL COULOMETER

Earl S. Snavely, Jr., Austin, Tex., assignor, by mesne assignments, to Union Carbide Corporation, New York, N.Y., a corporation of New York Application February 26, 1958, Serial No. 717,621

10 Claims. (Cl. 324—94)

This invention relates to an electrochemical coulometer.

In electrochemical coulometers known to the art a cell consisting of two compartments physically separated but electrochemically connected through a conducting liquid is used. The two compartments are filled with the conducting liquid which is an ionized solution of a reversible redox system such as iodide ions and iodine. This solution is sometimes referred to as the "electrolyte." An electrode is provided in each of the two compartments, and an electric current may be passed through the device. When current is passed, reduction occurs at the cathode and oxidation occurs at the anode. As current continues to flow, there is a transfer of ions to the two compartments. Hereinafter, the transferred ions or elements of the system will be referred to as "species." This transfer may be measured; usually the transfer of only one specie is measured. The amount transferred is proportional to the time of current flow. It may be determined visually, if the measured specie is colored, or by titration or other conventional means. In the case of the iodine-iodide system, $I_3^-$ is transferred from the cathode compartment and $I^-$ from the anode compartment. In this system iodine is the measured specie.

As indicated, devices of the type just described have been known and used for some time. However, their accuracy is not all that may be desired, and their use is therefore somewhat limited. As the concentrations of electrolyte in the two compartments differ, inaccuracy is caused for there is a diffusion of measured species from one compartment to the other whether or not current is passed through the system. This diffusion occurs whenever the concentrations are different in the two compartmens, and is aggravated as the difference in concentration increases.

It is the principal object of this invention to provide an electrochemical coulometer which will tend to overcome the disadvantages of prior devices of this kind. Another object of the invention is an accurate electrochemical coulometer which is completely reversible. Another object is an electrochemical coulometer of such construction that it can be made in miniature size without loss of accuracy.

In accordance with the invention these objects are achieved by the interposition between the two compartments of an electrochemical coulometer of the type described of a liquid which is immiscible with the electrolyte or solution in the two compartments and in which the measured specie of the system is substantially less soluble than it is in the solvent used in the two compartments for that specie. The lower concentration in this liquid for the measured specie as compared with its concentration in the solvent in the two compartments for it makes it possible to provide a zone or "barrier" in effect through which diffusion of the measured specie does not occur to any significant degree. Thus, it will be understood that in the electrochemical coulometer of this invention two immiscible liquids are employed, one in which the specie to be measured is highly soluble and the other in which it is much less soluble.

The invention will be described more specifically with reference to the accompanying drawing in which:

Figure 1 is a vertical section of a device embodying the invention;

Figure 2 is similar to Figure 1 but shows a modified form of device;

Figure 3 illustrates another modified form of coulometer embodying the invention;

Figure 4 is a vertical elevation of still another modified coulometer embodying the invention; and Figure 5 is a vertical section of still another modification of the invention.

The invention is adapted to use in any system suitable for use in electrochemical coulometers. These include the iodine-iodide system already mentioned, the ferrocyanide-ferricyanide system and the cerous-ceric ion system. For the sake of conciseness, particular reference will be made herein to the iodine-iodide system which is preferred. In this system iodine is the measured specie.

As has already been indicated, an important feature of the invention is the provision between the two compartments of an electrochemical coulometer of a liquid which is immiscible with the solvent for the measured specie present in the two compartments. This liquid may be, and preferably is immobilized as will be discussed in detail below. A great number of pairs of liquids may be used, one essential criterion being that there be a high distribution coefficient between the two, that is, that the measured specie be substantially more soluble in one than in the other. Thus, a high concentration of the measured specie may be attained in one liquid, while a low concentration is present in the other. Moreover, it is necessary that the liquid containing the low concentration of the measured specie be able to carry electric current, although the solvent for the measured specie in the two compartments need not be conductive. Of course, the freezing points and boiling points of the liquids must be appropriate to the intended use of the device, and these properties must be considered. The properties of the liquids too will have some effect on the construction of the coulometer as will be evident from consideration of the following and the drawing.

Referring now to the drawing and particularly to Figure 1 a coulometer C comprises two compartments 10, 12 separated by a porous glass disc 14. Adjacent to and in contact with opposite sides of the disc 14 are slightly cupped discs 16, 18 of absorbent paper. Electrodes 20, 22, suitably of platinum wire, are provided in the compartments 10, 12, respectively, make contact with the paper discs 16, 18 and provide for external contact to the coulometer by extending through its walls. An arrangement such as this is suitable for use with solvents which are conductors or non-conductors of electricity, for the electrode contact is made to the paper discs 16, 18 which are saturated with conductive liquid.

In a particular instance, in a coulometer constructed for the iodine-iodide system as shown in Figure 1 the solvent used in the compartments 10, 12 was carbon tetrachloride and the glass disc 14, and paper discs 16, 18 were saturated with water containing some potassium iodide. In another example of a coulometer embodying the invention and having the construction shown in Figure 1, the solvent in the compartments 10, 12 was carbon disulfide. In this case too, water was used as the other liquid.

Referring to Figure 2, another construction suitable for use with nonconductive solutions in the two compartments 26, 28 of a coulometer $C_2$ employs a separator 30 in opposite faces of which electrodes 32, 34 are embedded. The separator 30 may be any material capable of immobilizing the liquid employed between the compartments but is preferably porous glass.

If the solution contained in the two comparments of a coulometer is a conductor of electricity it is not necessary that the electrodes make contact with the separator. A coulometer utilizing an electrically conducting solution is illustrated in Figure 3. In the coulometer $C_3$ there shown, electrodes 36, 38 suitably of platinum wire are provided in the two compartments 40, 42 of the device and extend outwardly thereof but do not make contact with the separator 44 between the compartments 40, 42. It will be appreciated that this construction is somewhat simpler to manufacture than the construction already described. It is suitable for use in the iodine-iodide system with nitrobenzene as the solvent for iodine and potassium iodide in the two compartments, a porous glass separator containing an aqueous solution of potassium iodide.

The constructions described have been characterized by the fact that the liquid between the two compartments of the coulometer is immobilized by a separator. This makes it possible to utilize the device in any position and for this reason is a generally preferred construction. However, it is entirely possible to construct a coulometer embodying the principles of the invention without the use of a separator.

Such a construction is illustrated in Figure 4. A coulometer $C_4$ is constructed of glass tubing arranged in generally V-shaped fashion. In the apex portion 46 of the V is a liquid in which only a low concentration of a specie to be measured can be dissolved. Into the two legs 48, 50 of the V each of which contains solvent for the specie to be measured project electrodes 52, 54. In this construction then separation between the two compartments of the coulometer is provided by the liquid in the apex portion 46 of the V. To achieve immobilization of this liquid it may be jelled, for example with agar.

Separation between the two compartments of a coulometer embodying the invention may be achieved in still another way as illustrated in Figure 5. In this case a coulometer $C_5$ has two compartments 56, 58 separated by a capillary 60 containing a liquid immiscible with that in the compartments 56, 58. At opposite ends of the capillary 60, electrodes 62, 64, suitably of platinum gauze are provided.

A great number of coulometers embodying the principles of the invention and of the constructions illustrated have been made and tested. These tests have shown that the devices are extremely sensitive, completely reversible, and reduce diffusion due to differences in solution concentrations to a minimum.

For example, one series of tests was conducted on coulometers of the construction of Figure 1 using the iodine-iodide system. The solvent for the high concentration of iodine was carbon tetrachloride and the separator was saturated with water containing potassium iodide in solution. The carbon tetrachloride solution contained iodine, the normality of the solution with respect to iodine ($I_2$) being 0.0033N. The coulometer was connected to a battery of 0.9 volt and average current of 12 micro amperes was passed through it for about two days until the concentration of iodine in the anode compartment was 0.0066N. The coulometer was disconnected from the battery and the rate of back-diffusion was observed using color standards. The following table lists the concentrations in normality of iodine ($NI_2$) observed in the cathode compartment after the times indicated.

*Table I*

| Hours: | Concentration—$Ni_2$ |
|---|---|
| 0 | 0.000066 |
| 142 | 0.00016 |
| 191 | 0.00016 |
| 218 | 0.00033 |
| 361 | * |
| 913 | 0.0011 |

* Concentration greater than 0.00033 but less than 0.00066.

These data show that after 38 days the back-diffusion in the coulometer amounted to only about 30% of the amount of iodine transferred by electrolysis. In a coulometer of the same system using the same type of separator but otherwise identical with prior art construction, that is with only one liquid in the system, back-diffusion greater than 30% occurs in only one day.

Thus it will be seen that the invention provides a coulometer of great accuracy. Furthermore it can be made in very small sizes without loss of accuracy. For example, many have been made of the construction illustrated in Figure 5 the overall length of which is not more than one inch. This miniaturization extends the fields of usefulness of the device greatly.

Because of its sensitivity and accuracy the coulometer of the invention gives an accurate reading of the quantity of current that passes through a circuit. It is useful in any operation where it is desired to measure the quantity of electricity that has passed through a circuit, for instance in battery charging or electroplating operations. The device may be "read" by observing color change, as indicated above, or an auxiliary electrode may be provided to enable a continuing indication of the normality of the solution in a compartment of the coulometer to be obtained.

As stated above, a great number of liquids may be employed in a given system. For the iodine-iodide system, in addition to those liquids already mentioned, iso-amyl alcohol may be used, with water being the other of the two.

Generally, for all systems the liquid used in the two compartments will be an organic solvent and the other liquid will be an aqueous solution, but two organic liquids may be used. The principle criteria in any case, as already explained are that the two liquids be immiscible, that the distribution coefficient between the two be high, and that the liquid to dissolve a low concentration of the measured specie be a conductor of electricity.

The devices of the invention are conveniently made of glass and may be fabricated with conventional glass handling technique. For instance, glass tubing, preferably of the shock resistant type may be used. A "fritted" or sintered glass disc may be inserted into a length of such tubing and sealed therein by application of heat. Side tubes are now added to the tube on both sides of the disc, and the ends of the main tube are sealed, thus forming two compartments with a separator between them. Into each of these compartments is inserted an electrode.

Assuming that the device just described is to be used for the iodine-iodide system, it may be completed in the following manner. Into either compartment is poured a 1 normal water solution of potassium iodide, which solution is saturated with nitrobenzene. The solution is imbibed by the glass disc, and the excess is poured off. Each compartment is now filled with a solution of iodine in nitrobenzene (normality=0.025) which is saturated with aqueous potassium iodide solution. The side tubes may now be sealed. The electrodes are then connected to a source of current, and current is passed through the device until all the iodine in one compartment has been transferred to the other compartment. The coulometer is now ready for use.

Instead of glass, transparent, colorless plastic may be used if desired; if the device is to be read electrically, it need not be transparent. Similarly, other modifications in materials, construction and methods of filling the compartments and readying the coulometer for use will occur to those skilled in the art and are within the scope of the invention.

I claim:

1. An electrochemical coulometer of the type which functions by electrolytic transfer of at least one chemical species in a reversible redox system, and in which measurement of the transfer of one of such species is made, said coulometer comprising two compartments containing a solution of said species in a solvent, said compartments being connected through an electrolytically conductive path, and, between said compartments, a liquid immiscible with said solution and in which said measured species has a solubility substantially less than its solubility in said solvent, said liquid providing said electrolytically conducting path between said compartments.

2. A coulometer as defined by claim 1 in which said liquid is immobilized in a diaphragm between said compartments.

3. A coulometer as defined by claim 2 in which electric connection is made to each of said compartments by means of electrodes incorporated in said diaphragm.

4. A coulometer as defined by claim 1 in which said measured species is iodine and said reversible redox system is iodine-iodide.

5. A coulometer as defined by claim 4 in which said solvent is nitrobenzene.

6. A coulometer as defined by claim 5 in which said liquid is water containing potassium iodide in solution.

7. A coulometer as defined by claim 4 in which said solvent is carbon disulfide.

8. A coulometer as defined by claim 7 in which said liquid is water containing potassium iodide in solution.

9. A coulometer as defined by claim 1 in which said measured specie is ferricyanide and said reversible redox system is ferrocyanide-ferricyanide.

10. A coulometer as defined by claim 1 in which said measured specie is cerous ion and said reversible redox system is cerous-ceric.

No references cited.